(12) United States Patent
Chang et al.

(10) Patent No.: US 7,843,450 B2
(45) Date of Patent: Nov. 30, 2010

(54) SYSTEM AND METHOD FOR FILTERING POINT CLOUDS

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1033 days.

(21) Appl. No.: 11/565,646

(22) Filed: Dec. 1, 2006

(65) Prior Publication Data

US 2007/0253635 A1    Nov. 1, 2007

(30) Foreign Application Priority Data

Apr. 28, 2006    (CN) .................. 2006 1 0060508

(51) Int. Cl.
*G06T 17/00* (2006.01)
*G01B 7/004* (2006.01)

(52) U.S. Cl. ..................... 345/420; 702/152

(58) Field of Classification Search ............. 345/953
See application file for complete search history.

(56) References Cited

U.S. PATENT DOCUMENTS

| | | | |
|---|---|---|---|
| 6,420,698 B1 * | 7/2002 | Dimsdale .............. 250/234 |
| 6,701,006 B2 * | 3/2004 | Moore et al. ............. 382/154 |
| 7,065,461 B2 | 6/2006 | Chang et al. | |
| 7,586,489 B2 * | 9/2009 | Muller-Fischer et al. .... 345/427 |
| 7,720,647 B2 * | 5/2010 | Chang et al. ............ 702/190 |
| 2007/0024611 A1 * | 2/2007 | Ingram .................. 345/419 |

OTHER PUBLICATIONS

Lee, K.H. et al. "Point Data Reduction Using 3D Grids." in: International Journal of Advanced Manufacturing Technology (2001) vol. 18, pp. 201-210.*

* cited by examiner

*Primary Examiner*—Jason M Repko
(74) *Attorney, Agent, or Firm*—Wei Te Chung

(57) ABSTRACT

An exemplary system for filtering point clouds is disclosed. The system includes at least one client computer (5), a point cloud collecting device (6) and an application server (7) configured between the client computer and the point cloud collecting device. The application server includes a converging module configured for converging a plurality of point clouds produced by scanning a physical object, simulating a digitalized figure based on the plurality of point clouds, and displaying the digitalized figure on a display of the client computer; a filtering module configured for filtering redundant points in the point clouds to obtain a merged point cloud without any redundant points; and a storing module configured for storing the merged point cloud in the application server. A related method is also disclosed.

8 Claims, 4 Drawing Sheets

SYSTEM AND METHOD FOR FILTERING POINT CLOUDS

BACKGROUND OF THE INVENTION

1. Field of the Invention

The present invention relates to point cloud editing systems and methods, and more particularly, is related to a system and method for filtering point clouds via a computer aided verification (CAV) tool.

2. Description of Related Art

Product quality has long been one of the most important factors in maintaining a manufacturing enterprise's competitiveness. Improving the quality of products is an important ongoing pursuit of an enterprise. It is essential to verify the correctness and accuracy of components of various assembled products. With more and more manufactured products becoming increasingly complex, the burden of verification is increasing too. There is now a burgeoning need to verify components of products rapidly and precisely. Nevertheless, many enterprises still perform verification by employing numerous manual tasks and test programs that are non-standard. This can slow down output, and can seriously affect the accuracy and consistency of the verification performed.

In recent years, with the performance of computer hardware and software continually improving and with the prices of such equipment becoming more competitive, computers play a major role in the process of verification. Computer equipment can greatly improve the efficiency and accuracy of verification. This can be done by using a scan apparatus to scan an object to be verified, in order to obtain a plurality of discrete points commonly called a point cloud. The point cloud can be inputted to the computer to form a digitalized figure of the object. The object will be verified by analyzing and processing the point cloud data by executing particular software. The art of analyzing and processing data on an object is disclosed in patents such as U.S. Pat. No. 6,738,727, entitled System and Methods for Analyzing and Processing data on an object. This invention can automatically measure the object and help to guide production by comparing the measurement data with the design data. The system comprises an automatic scanning and measuring sub-system for obtaining point cloud data by scanning the object and generating measurement data on the object by processing the point cloud data.

Even though the system discloses how to obtain point cloud data, there are many redundant points mixed in the point cloud, which would influence the processing speed and accuracy of the point cloud data. Current technology does not teach how to filter the redundant points automatically and user always has to filter them manually.

Therefore, what is needed is a system and method for filtering cloud points, which is capable of filtering the cloud points automatically and accurately.

SUMMARY OF THE INVENTION

One embodiment provides a system for filtering point clouds. The system includes at least one client computer, a point cloud collecting device and an application server configured between the client computer and the point cloud collecting device. The application server includes a converging module configured for converging a plurality of point clouds produced by scanning a physical object, simulating a digitalized figure based on the plurality of point clouds, and displaying the digitalized figure on a display of the client computer; a filtering module configured for filtering redundant points in the point clouds. The filtering module includes an intersection calculating sub-module configured for identifying boundary points of each point cloud, calculating an intersection between each two point clouds according to the boundary points of the two point clouds, and deriving a length of each edge of the intersection on X-axis, Y-axis and Z-axis; an intersection mapping sub-module configured for mapping a grid on each intersection by setting an interval between each axis; and a redundant point deleting sub-module configured for deleting redundant points in each square of the grid on each intersection to obtain a merged point cloud without any redundant points.

Another embodiment provides a computer-based method for filtering point clouds. The method includes the steps of: (a) converging a plurality of point clouds produced by scanning a physical object, simulating a digitalized figure based on the plurality of point clouds, and displaying the digitalized figure on a display of a client computer; (b) identifying boundary points of each point cloud, calculating an intersection between each two point clouds according to the boundary points of the two point clouds, and deriving a length of each edge of the intersection on X-axis, Y-axis and Z-axis; (c) mapping a grid on each intersection by setting an interval between each axis; and (d) deleting redundant points in each square of the grid on each intersection to obtain a merged point cloud without any redundant points.

Other objects, advantages and novel features of the embodiments will be drawn from the following detailed description together with the attached drawings, in which:

DETAILED DESCRIPTION OF THE INVENTION

Figure 1:
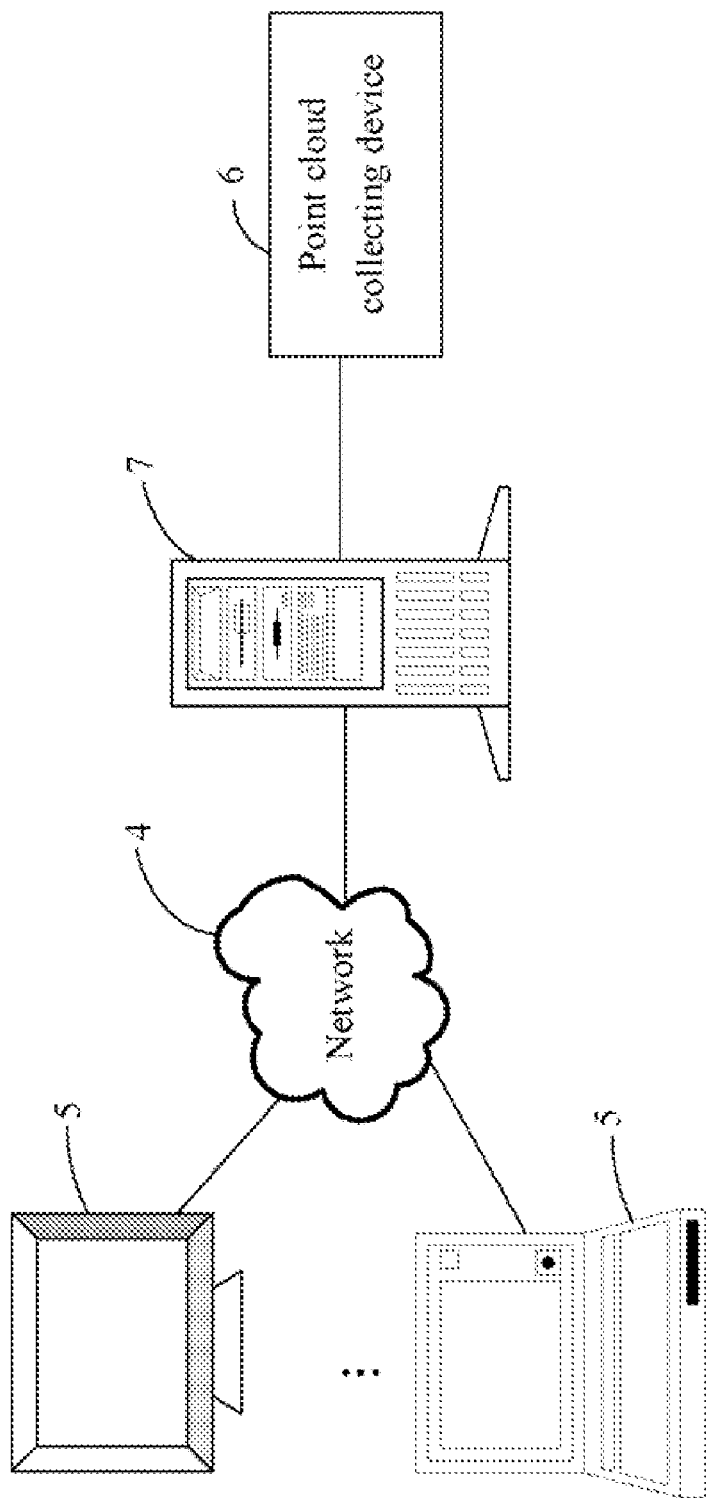
FIG. 1 is a schematic diagram of a hardware configuration of a system for filtering point clouds in accordance with a preferred embodiment.

FIG. 1 is a schematic diagram of a hardware configuration of a system for filtering cloud points (hereinafter, "the system") in accordance with a preferred embodiment. The system may include a point cloud collecting device 6, an application server 7, and a plurality of client computers 5 (only two shown). The client computers 5 are connected with the application server 7 via a network 4. The network 4 may be an intranet, the Internet, or any other suitable type of communications link.

The point cloud collecting device 6 is connected with the application server 7, and is structured and arranged for collecting a plurality of point clouds produced by scanning a physical object. In the preferred embodiment, the point cloud collecting device 6 is a scanning machine.

The application server 7 is configured for merging the plurality of point clouds of the physical object, simulating a digitalized figure based on the plurality of point clouds, and filtering redundant points in the digitalized figure. In other words, the plurality of point clouds are mapped and transformed onto a single coordinate system correspondingly to form the digitalized figure. The application server 7 has a plurality of software function modules installed therein for processing the plurality of point clouds. The client computers 5 may be located at various locations (e.g., different internal departments) of an organization with the system. Users in the organization can access the application server 7 via any one of the client computers 5, and retrieve results after processing the point clouds. Each client computer 5 provides a graphical user interface (GUI) for displaying the digitalized figure.

Figure 2:
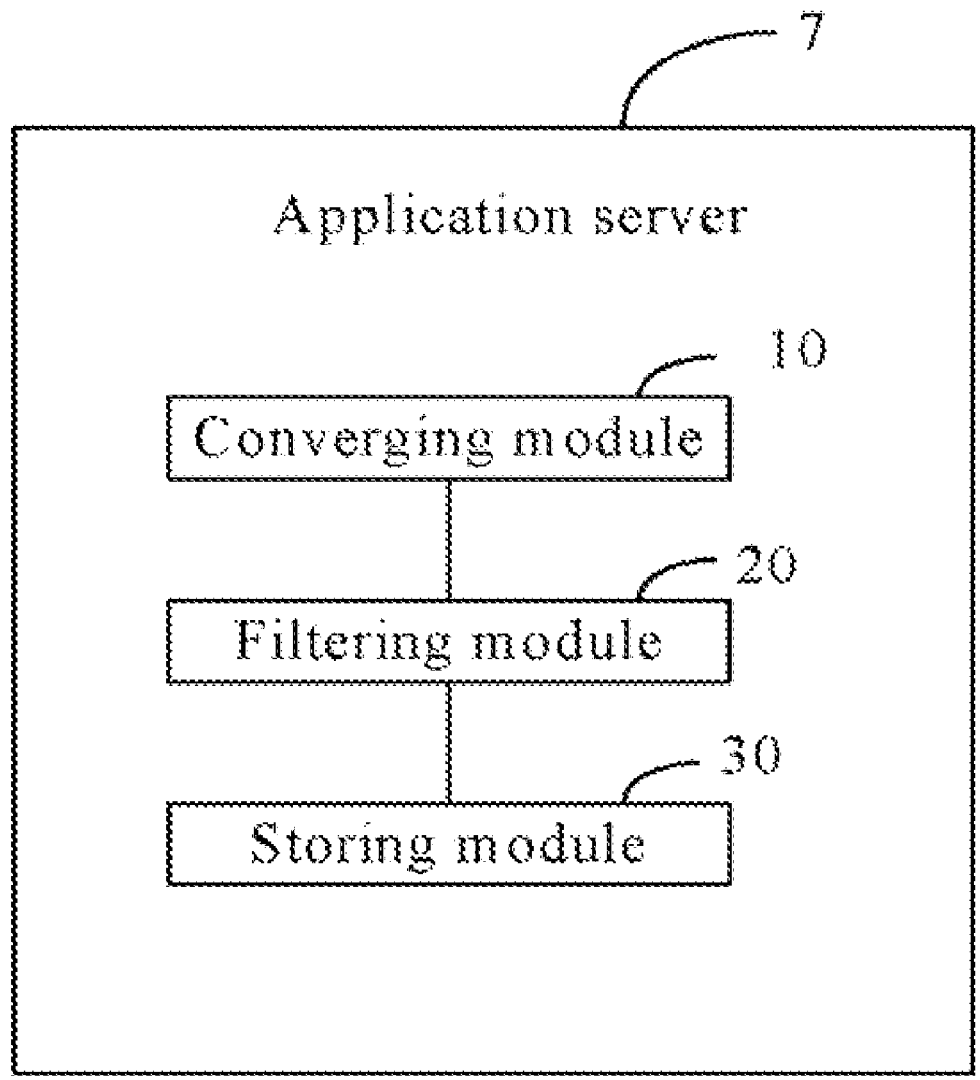
FIG. 2 is a schematic diagram of main function modules of the application server of the system of FIG. 1.

FIG. 2 is a schematic diagram of main function modules of the application server 7. The application server 7 typically includes a converging module 10, a filtering module 20, and a storing module 30.

The converging module 10 is configured for converging the plurality of point clouds, simulating the digitalized figure, and displaying the digitalized figure on a display of any client computer 5.

The filtering module 20 is configured for filtering redundant points in the point clouds to obtain a merged point cloud without any redundant points. Generally, a point cloud is produced after scanning the physical object a single time. If two point clouds are produced, such as a first point cloud and a second point cloud, the filtering module 20 filters one of the two point clouds based on the other. If three or more than three point clouds are produced, the filtering module 20 filters the point clouds in a cyclic pattern. For example, the filtering module 20 filters the second point cloud based on the first point cloud, then filters the third point cloud based on the second point cloud filtered, until the filtering module 20 filters the first point cloud based on the last point cloud filtered, such that the remaining points collectively form the merged point cloud without any redundant points. In the preferred embodiment, two point clouds are used as an example on how the converging module 10 merges two point clouds, the first point cloud and the second point cloud. An example of a filtering process for the intersection between the first point cloud and the second point cloud is shown below, namely, an example of the filtering module 20 filtering the second point cloud based on the first point cloud.

The storing module 30 is configured for storing the merged point cloud in the application server 7.

Figure 3:
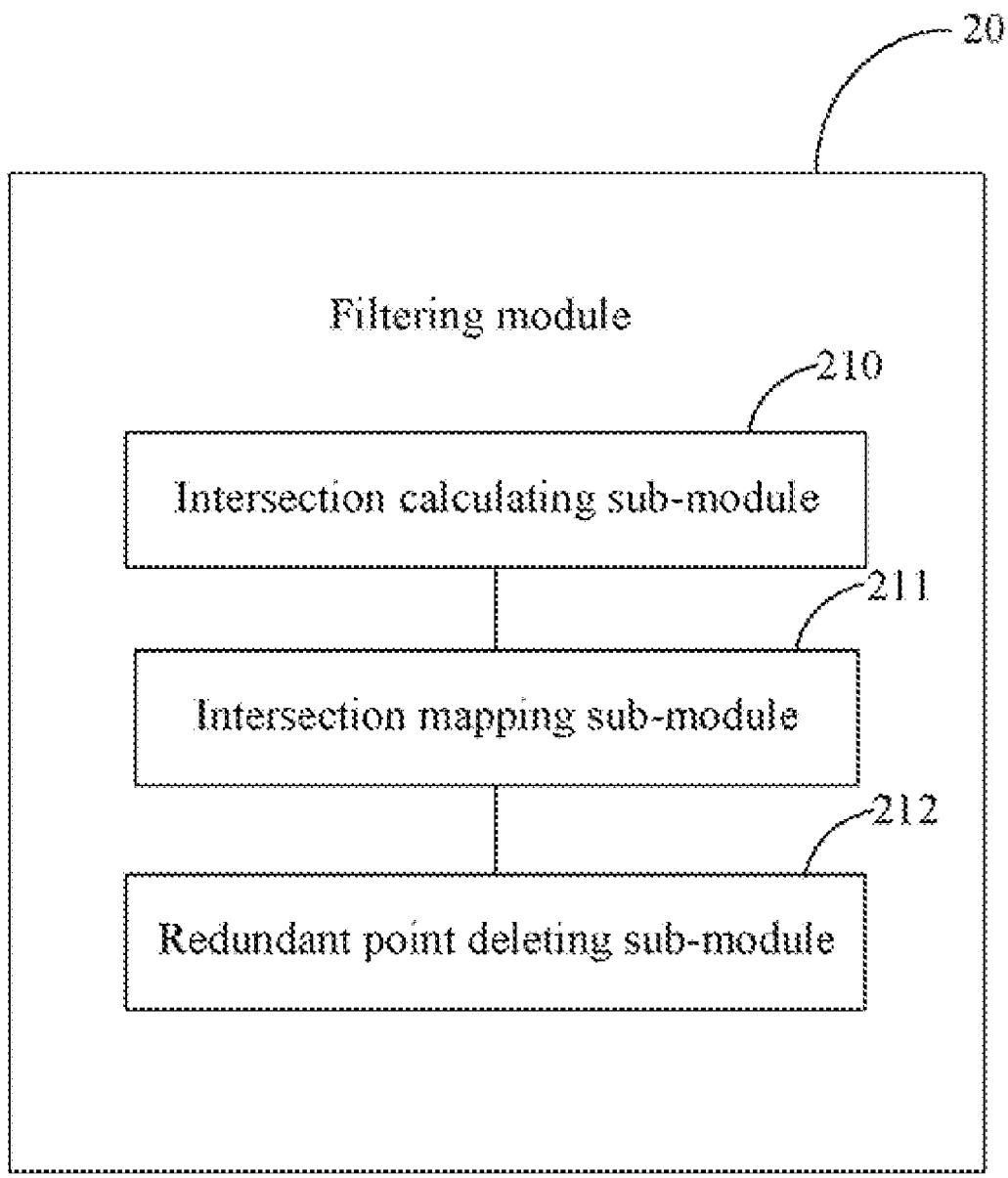
FIG. 3 is a schematic diagram of main function sub-modules of the filtering module of FIG. 2.
Figure 4:
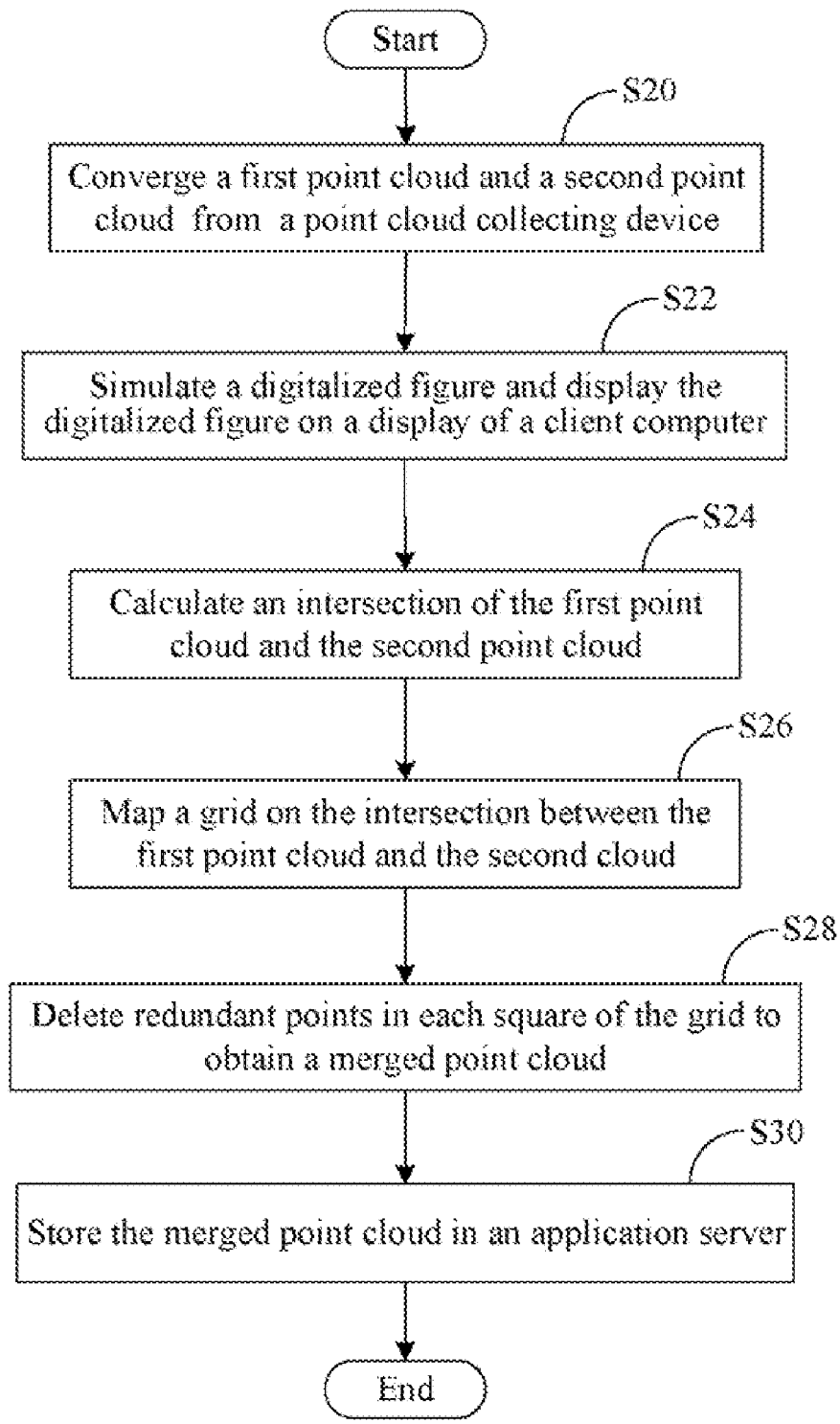
FIG. 4 is a flow chart of a preferred method for filtering point clouds by utilizing the system of FIG. 1.

FIG. 3 is a schematic diagram of main function sub-modules of the filtering module 20. The filtering module 20 includes an intersection calculating sub-module 210, an intersection mapping sub-module 211, and a redundant point deleting sub-module 212.

The intersection calculating sub-module 210 is configured for identifying boundary points of the first point cloud and boundary points of the second point cloud, and calculating the intersection between the first point cloud and the second point cloud according to the boundary points of the first point cloud and the boundary points of the second point cloud. Specifically, each point cloud consists of a plurality of points, the intersection calculating sub-module 210 compares points of each point cloud recursively and obtains the boundary points of each point cloud. I.e., the intersection calculating sub-module 210 analyzes the coordinates of each point in the point cloud. The intersection calculating sub-module 210 calculates the intersection between the first point cloud and the second point cloud according to the boundary points of the first point cloud and the boundary points of the second point cloud. The intersection calculating sub-module 210 also derives a length of each edge of the intersection on X-axis, Y-axis, and Z-axis.

The intersection mapping sub-module 211 is configured for mapping a grid on the intersection between the first point cloud and the second point cloud. The interval of the grid is obtained by setting an interval between each axis by user.

The redundant point deleting sub-module 212 is configured for deleting redundant points of the first point cloud and the second point cloud in each square of the grid. In the preferred embodiment, the redundant point deleting sub-module 212 filters the second point cloud based on the first point cloud. Each point of the second point cloud is processed as an unanalyzed point in the following:

First, the redundant point deleting sub-module 212 compares the coordinates of the unanalyzed point with boundary points of the intersection to determine whether the unanalyzed point locates in the intersection. If the unanalyzed point doesn't locate in the intersection, the unanalyzed point is not analyzed further and another unanalyzed point is selected.

If the unanalyzed point locates in the intersection, the redundant point deleting sub-module 212 detects a square of the grid that the unanalyzed point locates in according to coordinates of the unanalyzed point, and calculates a distance between the unanalyzed point and any point of the first point cloud that also locates in the square. If the distance is less than a deleting distance, the unanalyzed point should be deleted. The deleting distance is a length set by users. In other words the unanalyzed point is deemed redundant if there exists the first point cloud contains a significant point that lies within the deleting distance of the unanalyzed point.

Otherwise, if the distance is greater than or equals to a deleting distance, the redundant point deleting sub-module 212 calculates the distances between the unanalyzed point and points of the first point cloud in circumambience squares around the square the unanalyzed point locates in. If there exists the first point cloud contains the significant point that lies within the deleting distance of the unanalyzed point, the unanalyzed point should be deleted. After each point of the second point cloud is analyzed as mentioned above, the merged point cloud without any redundant points is obtained.

FIG. 3 is a flow chart of a preferred method for filtering point clouds by utilizing the system of FIG. 1. In step S20, the converging module 10 converges the plurality of point clouds from the point cloud collecting device 6 by scanning the physical object. In the preferred embodiment, two point clouds are used as an example on how the converging module 10 merges two point clouds, the first point cloud and the second point cloud.

In step S22, the converging module 10 simulates the digitalized figure based on the point clouds, and displays the digitalized figure on the display of any client computer 5.

In step S24, the intersection calculating sub-module 210 identifies the boundary points of the first point cloud and the boundary points of the second point cloud, and calculates the intersection between the first point cloud and the second point cloud according to the boundary points of the first point cloud and the boundary points of the second point cloud. Specifically, each point cloud consists of a plurality of points, the intersection calculating sub-module 210 compares all points of each point cloud recursively and obtains the boundary points of each point cloud. I.e., the intersection calculating sub-module 210 analyzes the coordinates of each point in the point cloud. The intersection calculating sub-module 210 calculates the intersection between the first point cloud and the second point cloud according to the boundary points of the first point cloud and the boundary points of the second point cloud. The intersection calculating sub-module 210 also derives the length of each edge of the intersection on X-axis, Y-axis and Z-axis of the intersection.

In step S26, the intersection mapping sub-module 211 maps the grid on the intersection between the first point cloud and the second point cloud. The interval of the grid is obtained by setting an interval between each axis by user.

In step S28, the redundant point deleting sub-module 212 deletes the redundant points of the first point cloud and the second point cloud in each square of the grid. In the preferred embodiment, the redundant point deleting sub-module 212 filters the second point cloud based on the first point cloud. Each point of the second point cloud is processed as an unanalyzed point in the following:

First, the redundant point deleting sub-module 212 compares the coordinates of the unanalyzed point with boundary points of the intersection to determine whether the unanalyzed point locates in the intersection. If the unanalyzed point doesn't locate in the intersection, the unanalyzed point is not analyzed further and another unanalyzed point is selected.

If the unanalyzed point locates in the intersection, the redundant point deleting sub-module 212 detects the square of the grid that the unanalyzed point locates in according to the coordinates of the unanalyzed point, and calculates the distance between the unanalyzed point and any point of the first point cloud that also locates in the square. If the distance is less than the deleting distance, the unanalyzed point should be deleted. The deleting distance is a length set by users. In other words the unanalyzed point is deemed redundant if there exists the first point cloud contains a significant point that lies within the deleting distance of the unanalyzed point.

Otherwise, if the distance is greater than or equals to the deleting distance, the redundant point deleting sub-module 212 calculates the distances between the unanalyzed point and points of the first point cloud in circumambience squares around the square the unanalyzed point locates in. If there exists the first point cloud contains the significant point that lies within the deleting distance of the unanalyzed point, the unanalyzed point should be deleted. After each point of the second point cloud is analyzed as mentioned above, the merged point cloud without any redundant points is obtained.

In step S30, the storing module 30 stores the merged point cloud in the application server 7.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for filtering point clouds, the system comprising at least one client computer, a point cloud collecting device and an application server configured between the client computer and the point cloud collecting device, the application server comprising:
 a converging module configured for converging a first point cloud and a second point cloud produced by scanning a physical object, simulating a digitalized figure based on the first point cloud and the second point cloud, and displaying the digitalized figure on a display of the client computer;
 a filtering module configured for filtering redundant points in the first point cloud and the second point cloud, the filtering module comprising:
 an intersection calculating sub-module configured for identifying boundary points of the first point cloud and boundary points of the second point cloud, calculating an intersection between the first point cloud and the second point cloud according to the boundary points of the first point cloud and the boundary points of the second point cloud, and deriving a length of each edge of the intersection on X-axis, Y-axis and Z-axis of the intersection;
 an intersection mapping sub-module configured for mapping a grid on the intersection between the first point cloud and the second point cloud by setting an interval between each axis; and
 a redundant point deleting sub-module configured for deleting redundant points of the first point cloud and the second point cloud in each square of the grid on the intersection to obtain a merged point cloud without any redundant points,
 wherein the redundant point deleting sub-module deletes redundant points of the first point cloud and the second point cloud in each square of the grid on the intersection is performed as follows:
 (a) comparing coordinates of an unanalyzed point of the second point cloud with boundary points of the intersection to determine whether the unanalyzed point locates in the intersection, if the unanalyzed point doesn't locate in the intersection, the unanalyzed point is not analyzed further and another unanalyzed point is selected;
 (b) detecting a square of the grid that the unanalyzed point locates in according to the coordinates of the unanalyzed point if the unanalyzed point locates in the intersection, and calculating a distance between the unanalyzed point and any point of the first point cloud that also locates in the square, and deleting the unanalyzed point if the distance is less than a deleting distance set by users;
 (c) calculating the distances between the unanalyzed point and points of the first point cloud in circumambience squares around the square the unanalyzed point locates in if the distance is greater than or equals to a deleting distance, and deleting the unanalyzed point if the distance is less than the deleting distance;
 (d) repeating steps (a)-(c) until each point of the second point cloud is analyzed, to obtain the merged point cloud without any redundant points.

2. The system according to claim 1, wherein the application server further comprises a storing module configured for storing the merged point cloud in the application server.

3. The system according to claim 1, wherein the redundant point deleting sub-module deletes redundant points of the first point cloud and the second point cloud in each square of the grid on the intersection is performed as follows:
 filtering one of two point clouds based on the other if the two point clouds are produced by scanning the physical object.

4. The system according to claim 1, further the filtering module further configured for: filtering a second point cloud based on a first point cloud, filtering a third point cloud based on the second point cloud filtered, circularly until filtering the first point cloud based on the last point cloud filtered, if three or more than three point clouds are produced.

5. A computer-based method for filtering point clouds, the method comprising:
 converging a first point cloud and a second point cloud produced by scanning a physical object, simulating a digitalized figure based on the first point cloud and the second point cloud, and displaying the digitalized figure on a display of a client computer;
 identifying boundary points of the first point cloud and boundary points of the second point cloud, calculating an intersection between the first point cloud and the second point cloud according to the boundary points of the first point cloud and the boundary points of the second point cloud, and deriving a length of each edge of the intersection on X-axis, Y-axis and Z-axis of the intersection;

mapping a grid on the intersection between the first point cloud and the second point cloud by setting an interval between each axis; and deleting redundant points of the first point cloud and the second point cloud in each square of the grid on the intersection to obtain a merged point cloud without any redundant points wherein the step of deleting redundant points of the first point cloud and the second point cloud in each square of the grid on the intersection comprises:

(a) comparing coordinates of an unanalyzed point of the second point cloud with boundary points of the intersection to determine whether the unanalyzed point locates in the intersection, if the unanalyzed point doesn't locate in the intersection, the unanalyzed point is not analyzed further and another unanalyzed point is selected;

(b) detecting a square of the grid that the unanalyzed point locates in according to the coordinates of the unanalyzed point if the unanalyzed point locates in the intersection, and calculating a distance between the unanalyzed point and any point of the first point cloud that also locates in the square, and deleting the unanalyzed point if the distance is less than a deleting distance set by users;

(c) calculating the distances between the unanalyzed point and points of the first point cloud in circumambience squares around the square the unanalyzed point locates in if the distance is greater than or equals to a deleting distance, and deleting the unanalyzed point if the distance is less than the deleting distance;

(d) repeating steps (a)-(c) until each point of the second point cloud is analyzed, to obtain the merged point cloud without any redundant points.

6. The method according to claim 5, further comprising the step of:

storing the merged point cloud in an application server.

7. The method according to claim 5, wherein the step of deleting redundant points of the first point cloud and the second point cloud in each square of the grid on the intersection is performed as follows:

filtering one of two point clouds based on the other if the two point clouds are produced by scanning the physical object.

8. The method according to claim 5, further comprising:

filtering a second point cloud based on a first point cloud, filtering a third point cloud based on the second point cloud filtered, circularly until filtering the first point cloud based on the last point cloud filtered, if three or more than three point clouds are produced.

* * * * *